US011491718B2

(12) United States Patent
Sealy et al.

(10) Patent No.: US 11,491,718 B2
(45) Date of Patent: Nov. 8, 2022

(54) HYBRID ADDITIVE MANUFACTURING METHOD

(71) Applicant: NUtech Ventures, Lincoln, NE (US)

(72) Inventors: Michael Patrick Sealy, Lincoln, NE (US); Haitham Hadidi, Lincoln, NE (US); Guru Charan Reddy Madireddy, Lincoln, NE (US); Cody Kanger, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 1 day.

(21) Appl. No.: 17/126,350

(22) Filed: Dec. 18, 2020

(65) Prior Publication Data
US 2021/0187832 A1 Jun. 24, 2021

Related U.S. Application Data

(60) Provisional application No. 62/951,655, filed on Dec. 20, 2019.

(51) Int. Cl.
*B29C 64/188* (2017.01)
*B29C 64/273* (2017.01)
(Continued)

(52) U.S. Cl.
CPC ........... *B29C 64/188* (2017.08); *B22F 10/50* (2021.01); *B23K 26/356* (2015.10);
(Continued)

(58) Field of Classification Search
CPC ....... B33Y 40/20; B29C 64/188; B22F 10/50; B23K 26/356; C21D 10/005
See application file for complete search history.

(56) References Cited

U.S. PATENT DOCUMENTS

| 5,207,371 A | 5/1993 | Prinz et al. |
| 5,316,720 A * | 5/1994 | Spiegel ................... B29C 67/04 |
| | | 419/48 |

(Continued)

FOREIGN PATENT DOCUMENTS

| CN | 107262713 A * | 10/2017 | ............... B22F 3/003 |
| GB | 2598874 A * | 3/2022 | ............ C21D 10/005 |

(Continued)

OTHER PUBLICATIONS

Madireddy, Guru Charan Reddy, "Modeling Residual Stress Development in Hybrid Processing by Additive Manufacturing and Laser Shock Peening" (2018). Mechanical (and Materials) Engineering— Dissertations, Theses, and Student Research, University of Nebraska— Lincoln. 137. (Year: 2018).*

(Continued)

*Primary Examiner* — Atul P. Khare
(74) *Attorney, Agent, or Firm* — Fish & Richardson P.C.

(57) ABSTRACT

Methods, systems, and apparatus, for hybrid additive manufacturing of parts. In one aspect, a method includes providing a workpiece and manufacturing multiple additive layers on a surface of the workpiece. Manufacturing each of the multiple additive layers includes forming one or more formed layers on a surface of the workpiece by depositing a quantity of powder material on a growth surface, the growth surface inclusive of at least one of a first surface of the workpiece and a second surface of a previously formed layer, and applying a first amount of energy to the quantity of powder material to fuse the particles of the powder material into a formed layer fused to the growth surface, where the formed layer includes a formed surface, and further applying a secondary process to a particular area of the formed surface of the one or more formed layers on the workpiece.

20 Claims, 5 Drawing Sheets

(51) Int. Cl.
| | |
|---|---|
| B29C 64/153 | (2017.01) |
| B29C 64/209 | (2017.01) |
| B22F 10/50 | (2021.01) |
| B23K 26/356 | (2014.01) |
| B29C 64/30 | (2017.01) |
| B33Y 40/20 | (2020.01) |
| B33Y 10/00 | (2015.01) |
| B33Y 30/00 | (2015.01) |

(52) U.S. Cl.
CPC .......... *B29C 64/153* (2017.08); *B29C 64/209* (2017.08); *B29C 64/273* (2017.08); *B29C 64/30* (2017.08); *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 9,084,843 | B2 | 7/2015 | Guo et al. |
| 9,644,283 | B2* | 5/2017 | Hankey ............... B41M 5/262 |
| 10,166,751 | B2 | 1/2019 | Kramer et al. |
| 10,596,661 | B2* | 3/2020 | Kalentics ............ B22F 10/38 |
| 10,710,161 | B2 | 7/2020 | El-Wardany et al. |
| 11,224,944 | B1* | 1/2022 | Roper ................... C21D 1/613 |
| 2015/0266285 | A1* | 9/2015 | James .................. B33Y 40/00 148/556 |
| 2015/0283614 | A1 | 10/2015 | Wu et al. |
| 2017/0087670 | A1 | 3/2017 | Kalentics et al. |
| 2017/0129180 | A1* | 5/2017 | Coates .................. B29C 64/25 |
| 2018/0361509 | A1* | 12/2018 | Reznik .................. C22F 1/00 |
| 2019/0047050 | A1* | 2/2019 | Zhang ................. C23C 24/106 |
| 2019/0283184 | A1* | 9/2019 | Zhang ................ B23K 26/1464 |
| 2020/0009656 | A1* | 1/2020 | Kamel ............... C23C 28/3455 |
| 2021/0197278 | A1* | 7/2021 | Sano .................. B23K 26/0006 |

FOREIGN PATENT DOCUMENTS

| | | |
|---|---|---|
| WO | WO 2012/152259 | 11/2012 |
| WO | WO 2016/092253 | 6/2016 |

OTHER PUBLICATIONS

Kalentics, Nicola, "A new hybrid Additive Manufacturing process combining Selective Laser Melting and Laser Shock Peening" (2018). Sciences et Techniques de L'ingénieur Laboratoire de Métallurgie Thermomécanique—Dissertations, Thesis, École Polytechnique Fédérale de Lausannenne. (Year: 2018).*
Additive Manufacturing Technologies: 3D Printing, Rapid Prototyping, and Direct Digital Manufacturing, 2nd ed., Gibson et al. (ed.), 2015, pp. 1-498.
Akula et al., "Hybrid adaptive layer manufacturing: An Intelligent art of direct metal rapid tooling process," Robotics and Computer-Integrated Manufacturing, 2006, 22(2):113-123.
Bailey et al., "A parametric study on laser welding of magnesium alloy AZ31 by a fiber laser," Journal of Manufacturing Science and Engineering, 2015, 137(4):041003:1-9.
Berthe et al., "Shock waves from a water-confined laser-generated plasma," Journal of Applied Physics, 1997, 82(6):2826-2832.
Bourell et al., "Materials for additive manufacturing," CIRP Annals, 2017, 66(2):659-681.
Brandal et al., "Laser Shock Peening for Suppression of Hydrogen-Induced Martensitic Transformation in Stress Corrosion Cracking," Journal of Manufacturing Science and Engineering, 2017, 139(8):81015:1-10.
Campanelli et al., "Taguchi Optimization of the Surface Finish Obtained by Laser Ablation on Selective Laser Molten Steel Parts," Procedia CIRP, 2013, 12:462-467.
Cao et al., "Optimization of Processing Parameters During Laser Cladding of ZE41A-T5 Magnesium Alloy Castings Using Taguchi Method," Materials and Manufacturing processes, 2008, 23(4):413-418.
Chen et al., "Laser cladding of Mg20A180 powder on ZM5 magnesium alloy," Corrosion Engineering, Science and Technology, 2007, 42(2):130-136.
Choi et al., "Development of a direct metal freeform fabrication technique using CO2 laser welding and milling technology," Journal of Materials Processing Technology, 2001, 113(1-3):273-279.
Colegrove et al., "Application of bulk deformation methods for microstructural and material property improvement and residual stress and distortion control in additively manufactured components," Scripta Materialia, 2017, 135(Sup. C):111-118.
Colegrove et al., "High pressure interpass rolling of Wire + arc additively manufactured titanium components," Advanced Materials Research, 2014, 996:694-700.
Colegrove et al., "Microstructure and residual stress improvement in wire and arc additively manufactured parts through high-pressure rolling," Journal of Materials Processing Technology, 2013, 213(10):1782-1791.
Fabbro et al., "Physical study of laser-produced plasma in confined geometry," Journal of Applied Physics, 1990, 68(2):775-784.
Fairand et al., "Effect of water and paint coatings on the magnitude of laser-generated shocks," Optics Communications, 1976, 18:588-591.
Fairand et al., "Laser shock-induced microstructural and mechanical property changes in 7075 aluminum," Journal of Applied Physics, 1972, 43(9):3893-3895.
Field et al., "A Review of Measuring Methods for Surface Integrity," CIRP Annals, 1972, 21(2):219-238.
Field et al., "The Surface Integrity of Machined-and-Ground High Strength Steels," Problems in the Load-Carrying Application of High-Strength Steels Symposium, Columbus, OH, Oct. 26-28, 1964, AD0610750, pp. 54-77.
Field, "Surface Integrity—A new requirement for improving reliability of aerospace hardware," 18th A, Natl. SAMPE Symp., Los Angeles, CA, Apr. 3-5, 1973, pp. 1-27.
Flynn et al., "Hybrid additive and subtractive machine tools—Research and industrial developments," International Journal of Machine Tools and Manufacture, 2016, 101:79-101.
Friel et al., "Ultrasonic Additive Manufacturing—A Hybrid Production Process for Novel Functional Products," Procedia CIRP, 2013, 6:35-40.
Ge et al., "Effect of laser shock peening on microstructure and fatigue crack growth rate of AZ31B magnesium alloy," Journal of Alloys and Compounds, 2016, 680:544-552.
Ge et al., "Effect of laser shock peening on the stress corrosion cracking of AZ31B magnesium alloy in a simulated body fluid," Surface and Coatings Technology, 2017, 310:157-165.
Guo et al., "Significant improvement of corrosion resistance of biodegradable metallic implants processed by laser shock peening," CIRP Annals—Manufacturing Technology, 2012, 61(1):583-586.
Hartmann et al., "Robot-Assisted Shape Deposition Manufacturing," Proceedings of the 1994 IEEE International Conference on Robotics and Automation, San Diego, CA, May 1994, pp. 1-6.
Hornberger et al., "Biomedical coatings on magnesium alloys—A review," Acta Biomaterialia, 2012, 8(7):2442-2455.
Hur et al., "Hybrid rapid prototyping system using machining and deposition," Computer-Aided Design, 2002, 34(10):741-754.
Hutchinson et al., "Modeling the precipitation processes and strengthening mechanisms in a Mg—Al—(Zn) AZ91 alloy," Metallurgical and Materials Transactions A, 2005, 36(8):2093-2105.
Jeng et al., "Mold fabrication and modification using hybrid processes of selective laser cladding and milling," Journal of Materials Processing Technology, 2001, 110(1):98-103.
Kalentics et al., "3D Laser Shock Peening—A new method for the 3D control of residual stresses in selective laser melting," Materials & Design, 2017, 130:350-356.
Karunakaran et al., "Low cost integration of additive and subtractive processes for hybrid layered manufacturing" Robotics and Computer-Integrated Manufacturing, 2010, 26(5):490-499.
Karunakaran et al., "Rapid prototyping of metallic parts and moulds," Journal of Materials Processing Technology, 2000, 105(3):371-381.
Kerschbaumer et al., "Hybrid Manufacturing Process for Rapid High Performance Tooling Combining High Speed Milling and

(56) References Cited

OTHER PUBLICATIONS

Laser Cladding," Proceedings of the 23rd International Congress on Applications of Lasers & Electro-Optics (ICALEO), San Francisco, CA, Oct. 4-7, 2004, pp. 1-10.

Kruth et al., "Progress in Additive Manufacturing and Rapid Prototyping," CIRP Annals—Manufacturing Technology, 47(2), Jan. 1, 1998, pp. 525-540.

Kulkarni et al., "On the Integration of Layered Manufacturing and Material Removal Processes," Journal of Manufacturing Science and Engineering, Sep. 1, 1999, 122(1):100-108.

Lamikiz et al., "Laser polishing of parts built up by selective laser sintering," International Journal of Machine Tools and Manufacture, Feb. 20, 2007, 47(12-13):2040-2050.

Lauwers et al., "Hybrid processes in manufacturing," CIRP Annals, 2014, 63(2):561-583.

Levy et al., "Rapid Manufacturing and Rapid Tooling with Layer Manufacturing (LM) Technologies, State of the Art and Future Perspectives," CIRP Annals—Manufacturing Technology, 2003, 52(2):589-609.

Li et al., "Additively manufactured biodegradable porous magnesium," Acta Biomaterialia, 2018, 67:378-392.

Liou et al., "Applications of a Hybrid Manufacturing Process for Fabrication and Repair of Metallic Structures," Solid Freeform Fabrication Symposium, Austin, Texas, 2006, pp. 1-11.

Liou et al., "Research and Development of a Hybrid Rapid Manufacturing Process," Solid Freeform Fabrication Symposium, Austin, Texas, 2001, pp. 138-145.

Liu et al., "Effect of laser processing parameters on porosity, microstructure and mechanical properties of porous Mg—Ca alloys produced by laser additive manufacturing," Materials Science and Engineering: A, 2017, 703:359-371.

LSPTechnologies.com [online], "Surface Distribution of Residual Stresses," available on or before Feb. 11, 2013, via Internet Archive: Wayback Machine URL <http://web.archive.org/web/20130211075219/http://www.lsptechnologies.com/cs-effects-on-surface-residual-stress.php>, retrieved on Sep. 17, 2021, URL <http://www.lsptechnologies.com/cs-effects-on-surface-residual-stress.php>, 2 pages.

Madireddy, "Modeling Residual Stress Development in Hybrid Processing by Additive Manufacturing and Laser Shock Peening," University of Nebraska-Lincoln, Masters Thesis, Adviser M.P. Sealy, Apr. 21, 2018, 127 pages.

Manakari et al., "Selective Laser Melting of Magnesium and Magnesium Alloy Powders: A Review," Metals, 2017, 7(2):1-35.

Martina et al., "Improved Microstructure and Increased Mechanical Properties of Additive Manufacture Produced Ti—6Al—4V by Interpass Cold Rolling," Solid Freeform Fabrication Symposium, Austin, Texas, Aug. 12-14, 2014, pp. 490-496.

Martina et al., "Microstructure of Interpass Rolled Wire + Arc Additive Manufacturing Ti—6Al—4V Components," Metallurgical and Materials Transactions A, Oct. 13, 2015, 46(12):6103-6118.

Martina et al., "Residual stress of as-deposited and rolled wire+arc additive manufacturing Ti—6Al—4V components," Materials Science and Technology, 2016, 32(14):1439-1448.

Masse et al., "Laser generation of stress waves in metal," Surface and Coatings Technology, 1995, 70(2-3):231-234.

Merz et al., "Shape Deposition Manufacturing," Solid Freeform Fabrication Symposium, Austin, Texas, 1994, pp. 1-8.

Montross et al., "Laser shock processing and its effects on microstructure and properties of metal alloys: a review," International Journal of Fatigue, 2002, 24(10):1021-1036.

Nagel and Liou, "Hybrid Manufacturing System Design and Development," Manufacturing System, F.A. Aziz (ed.), 2012, InTech, 223-246.

Newman et al., "Process planning for additive and subtractive manufacturing technologies," CIRP Annals—Manufacturing Technology, 2015, 64(1):467-470.

Ng et al., "Layer manufacturing of magnesium and its alloy structures for future applications," Virtual and Physical Prototyping, Mar. 2010, 5(1):13-19.

Ng et al., "Microstructure and mechanical properties of selective laser melted magnesium," Applied Surface Science, 2011 257(17):7447-7454.

Optomec.com [online], "Optomec Receives Order for Controlled Atmosphere Hybrid 3D Printer," Dec. 2016, retrieved on Apr. 28, 2021, retrieved from URL <https://www.optomec.com/optomec-receives-order-controlled-atmosphere-hybrid-3d-printer/>, 3 pages.

Patil et al., "Effect of shot peening on stress corrosion behavior of biodegradable magnesium WE43," Society for Biomaterials Annual Meeting, Atlanta, GA, Apr. 11-14, 2018, 1 page.

Patil, "Effect of Shot Peening on Stress Corrosion Behavior of Biodegradable Magnesium WE43," Thesis for the degree of Master of Science, University of Nebraska, Department of Mechanical & Materials Engineering, Apr. 2018, 98 pages.

Pridham et al., "Part Fabrication Using Laser Machining and Welding," Solid Freeform Fabrication Symposium, Austin, Texas, 1993, pp. 74-80.

Prinz et al., "Processing, Thermal and Mechanical Issues in Shape Deposition Manufacturing," Carnegie Mellon University Engineering Design Research Center, 1995, pp. 1-18, 21 pages.

Qian et al., "Direct rapid high-temperature alloy prototyping by hybrid plasma-laser technology," Journal of Materials Processing Technology, 2008, 208(1-3):99-104.

Ramos-Grez et al., "Reducing surface roughness of metallic freeform-fabricated parts using non-tactile finishing methods," International Journal of Materials and Product Technology, 2004, 21(4):297-316.

Roberts et al., "A novel processing approach for additive manufacturing of commercial aluminum alloys," Physics Procedia, 2016, 83:909-917.

Salahshoor et al., "Biodegradation Control of Magnesium-calcium Biomaterial Via Adjusting Surface Integrity by Synergistic Cutting-burnishing," Procedia CIRP, 2014, 13:143-149.

Salahshoor et al., "Effects of Surface Integrity on In-vitro Corrosion of Biodegradable Magnesium-Calcium Orthopedic Implants," Proceedings of the ASME 2011 6th Frontiers in Biomedical Devices Conference, Irvine, CA, Sep. 26-27, 2011, 2 pages.

Schmid et al., "Process Influences on Laser-beam Melting of the Magnesium Alloy AZ91," Physics Procedia, 2016, 83:927-936.

Schmidt et al., "Laser based additive manufacturing in industry and academia," CIRP Annals, 2017, 66(2):561-583.

Sealy & Guo, "Presentation: Fatigue Performance of Biodegradable Mg—Ca Implants by Laser Shock Peening and Its Future in Additive Manufacturing," Presentation, Presented at Proceedings of the International Academy for Production Engineering (CIRP) Winter Meeting: STC E: Electro-Physical and Chemical Processes, Paris, France, Feb. 17-19, 2016, 20 pages.

Sealy et al., "A Strategy to Optimize Recovery in Orthopedic Sports Injuries," Journal of Bioanalysis & Biomedicine, 2017, 9(3):144-151.

Sealy et al., "Fabrication and characterization of surface texture for bone ingrowth by sequential laser peening biodegradable orthopedic magnesium-calcium implants," ASME Journal of Medical Devices, 2011, 5(1):1-9.

Sealy et al., "Fabrication and Finite Element Simulation of Micro-Laser Shock Peening for Micro Dents," International Journal for Computational Methods in Engineering Science and Mechanics, 2009, 10(2):134-142.

Sealy et al., "Fatigue performance of biodegradable magnesium-calcium alloy processed by laser shock peening for orthopedic implants," International Journal of Fatigue, 2016, 82(Part 3):428-436.

Sealy et al., "Finite Element Modeling of Hybrid Additive Manufacturing by Laser Shock Peening," 27th Annual International Solid Freeform Fabrication Symposium, Aug. 8-10, 2016, pp. 306-316.

Sealy et al., "Glocal integrity in 420 stainless steel by asynchronous laser processing," CIRP Annals—Manufacturing Technology, 2019, 68(1):189-192.

Sealy et al., "Hybrid Processes in Additive Manufacturing," Journal of Manufacturing Science and Engineering, 2018, 140(6):060801:1-13.

Sealy et al., "Pulsed Laser Cutting of Magnesium-Calcium for Biodegradable Stents," Procedia CIRP, 2016, 42:67-72.

(56) References Cited

OTHER PUBLICATIONS

Sealy et al., "Surface integrity and process mechanics of laser shock peening of novel biodegradable magnesium-calcium (Mg—Ca) alloy," Journal of the Mechanical Behavior of Biomedical Materials, 2010, 3(7):488-496.

Shuai et al., "Biodegradation Resistance and Bioactivity of Hydroxyapatite Enhanced Mg—Zn Composites via Selective Laser Melting," Materials (Basel), 2017, 10(3):1-12.

Song et al., "3D Welding and Milling—A Direct Approach for Fabrication of Injection Molds," Solid Freeform Fabrication Symposium, Austin, Texas, 1999, pp. 793-800.

Song et al., "Experimental investigations into rapid prototyping of composites by novel hybrid deposition process," Journal of Materials Processing Technology, 2006, 171(1):35-40.

Sreenathbabu et al., "Statistical process design for hybrid adaptive layer manufacturing," Rapid Prototyping Journal, 2005, 11(4):235-248.

Sridharan et al., "Evaluation of micro structure stability at the interfaces of Al-6061 welds fabricated using ultrasonic additive manufacturing," Materials Characterization, 2018, 139:249-258.

Tang et al., "Rapid solidification: selective laser melting of AlSi10Mg," JOM, 2016, 68(3):960-966, 6 pages.

Wang et al., "Size effects on flow stress behavior during electrically-assisted micro-tension in a magnesium alloy AZ31," Materials Science and Engineering: A, 2016, 659:215-224.

Waterman et al., "Coating Systems for Magnesium-Based Biomaterials—State of the Art," in Magnesium Technology, Sillekens et al. (eds.), 2011, p. 403-408.

Wei et al., "Effect of energy input on formability, microstructure and mechanical properties of selective laser melted AZ91D magnesium alloy," Materials Science and Engineering: A, 2014, 611:212-222, 37 pages.

Wei et al., "Influence of element vaporization on formability, composition, microstructure, and mechanical performance of the selective laser melted Mg—Zn—Zr components," Materials Letters, 2015, 156:187-190.

Xie et al., "A novel metamorphic mechanism for efficient additive manufacturing of components with variable wall thickness," Solid Freeform Fabrication Symposium, Austin, Texas, 2014, pp. 210-223.

Xie et al., "Improvement in Geometrical Accuracy and Mechanical Property for Arc-Based Additive Manufacturing Using Metamorphic Rolling Mechanism," Journal of Manufacturing Science and Engineering, 2016, 138(11):111002:1-8.

Yasa et al., "Application of Laser Re-melting on Selective Laser Melting Parts," Advances in Production Engineering and Management, 2011, 6(4):259-270.

Yasa et al., "Manufacturing by combining Selective Laser Melting and Selective Laser Erosion/laser re-melting," CIRP Annals, 2011, 60(1):263-266.

Yasa et al., "The investigation of the influence of laser re-melting on density, surface quahty and microstructure of selective laser melting parts," Rapid Prototyping Journal, 2011, 17(5):312-327.

Zhang et al., "Comparison of calcium phosphate coatings on Mg—Al and Mg—Ca alloys and their corrosion behavior in Hank's solution," Surface and Coatings Technology, 2010, 204(21-22):3636-3640.

Zhang et al., "Effects of laser shock processing on stress corrosion cracking susceptibility of AZ31B magnesium alloy," Surface and Coatings Technology, 2010, 204(24):3947-3953.

Zhang et al., "Effects of processing parameters on properties of selective laser melting Mg-9%Al powder mixture," Materials & Design, 2012, 34(0):753-758.

Zhang et al., "Hybrid Deposition and Micro Rolling Manufacturing Method of Metallic Parts," Solid Freeform Fabrication Symposium, Austin, Texas, 2013, pp. 267-281.

Zhang et al., "Study on Metamorphic Rolling Mechanism for Metal Hybrid Additive Manufacturing," Solid Freeform Fabrication Symposium, Austin, Texas, 2013, pp. 188-189.

Zhou et al., "Simulation of microstructure evolution during hybrid deposition and micro-rolling process," Journal of Materials Science, 2016, 51(14):6735-6749.

Zhu et al., "Application of a hybrid process for high precision manufacture of difficult to machine prismatic parts," The International Journal of Advanced Manufacturing Technology, 2014, 74(5-8):1115-1132.

* cited by examiner

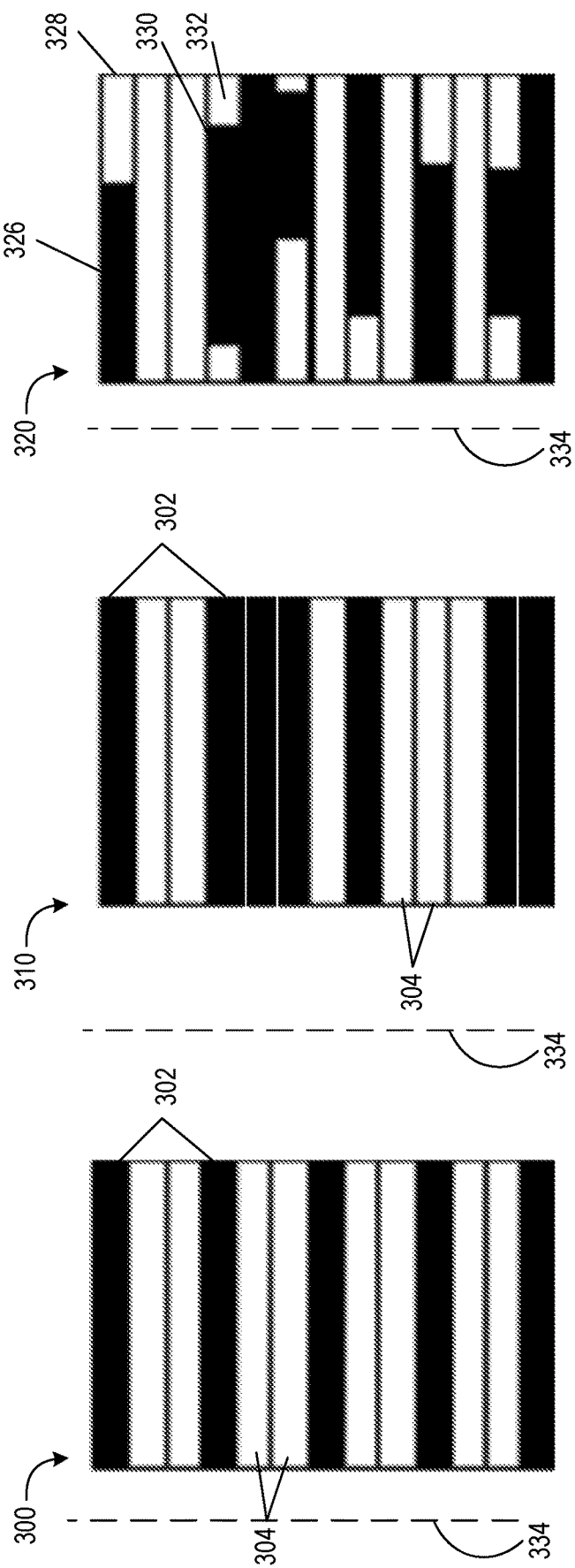

HYBRID ADDITIVE MANUFACTURING METHOD

CROSS-REFERENCE TO RELATED APPLICATIONS

This application claims priority to U.S. provisional application 62/951,655, filed on Dec. 20, 2019. The entire contents of the above application is incorporated by reference.

BACKGROUND

This specification relates to hybrid additive manufacturing techniques.

SUMMARY

This specification describes technologies relating to hybrid additive manufacturing techniques for manufacturing parts with customizable compositions of matter. More specifically, the technology described here includes methods for combining mechanical surface treatments, e.g., cold working processes, with additive manufacturing, e.g., three-dimensional (3D) printing processes, to customize physical, mechanical, and chemical properties of the resulting manufactured part.

Particular embodiments of the subject matter described in this specification can be implemented so as to realize one or more of the following advantages. The hybrid additive manufacturing techniques described can be utilized to manufacture materials of customized composition, including physical, mechanical, and chemical properties. The combination of additive manufacturing with secondary mechanical processing can achieve mechanical and chemical alterations to generate materials with increased strength and better control of structural integrity during corrosion, e.g., for high corrosion rate magnesium plugs used in oil and gas fracking applications. The hybrid manufacturing techniques can be applied instead to manufacture materials with intentional defects, e.g., to make biodegradable implants that dissolve over time due to particular physical, chemical, and mechanical properties resulting from the hybrid manufacturing techniques. Locally modifying layers with surface treatments, e.g., cold working, has global implications for performance. The processes described can provide a framework for defining local integrity with global implications as an aggregate surface integrity.

In some embodiments, a secondary process includes interlayer peening of individual layers and/or portions of individual layers in a periodic or non-periodic manner, and can result in improved surface finishes, refined microstructures, reduced distortion, increased hardness, higher densities, and favorable compressive residual stresses. Further, cold working layers during printing can improve toughness by imparting a complex glocal (i.e., local with global implications) integrity across pre-designed internally reinforced domains. The term "glocal integrity" refers to a cumulative surface integrity enabled by secondary processing of individual layers during printing. For example, laser peening during 3D printing can impart cold worked regions, which evolve and interact with each other as a build progresses. These interactions entangle compounding residual stress fields and can produce complex microstructures.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3C are cross-sectional views along axis 334 of example layer structures including interlayer secondary processes at varying periodic and/or non-periodic intervals.

Like reference numbers and designations in the various drawings indicate like elements.

DETAILED DESCRIPTION

Overview

Hybrid additive manufacturing (hybrid-AM) by asynchronous laser processing can include multi-process, multi-material, multi-structure, multi-function, and multi-machine platforms. As used herein, hybrid-AM processes are the use of additive manufacturing with one or more secondary processes or energy sources that are fully coupled and synergistically affect part quality, functionality, and/or process performance. The fully coupled processes are processes that inherently cannot be separated from the hybrid-AM process without changing the result. For example, layer-by-layer peening is fully coupled because the peening of each layer occurs between the additive manufacturing, e.g., three-dimensional (3D) printing, of the layers. The secondary processes can be location- and time-independent and are not necessarily simultaneous to the additive manufacturing processes.

Secondary processes can be surface treatments that are integrated layer-by-layer with additive manufacturing processes to manufacture three-dimensional printed mechanical properties throughout a build volume. Secondary process can be utilized to alter a surface integrity of a build volume, where surface integrity is a three-dimensional phenomenon characterized across multiple length scales and extending several millimeters below an external surface. The depth of penetration of a surface treatment can be dependent on the manufacturing process and the respective process parameters.

Using a hybrid additive manufacturing technique, each layer in a build volume is capable of being secondarily processed to impart a unique surface integrity. As the additive process continues, the surface integrity in an individual layer combines with previously modified layers to create a complex aggregate build integrity throughout the entire build volume. Local changes within single layers accumulate and can be transmitted through layers, thereby affecting global behavior. Tailored mechanical, physical, and chemical properties from processing can be integrated throughout the build volume, where each layer in the build is capable of a unique surface integrity that evolves into a final complex aggregate build integrity.

Secondary processes can be utilized to inhibit dislocation motion, e.g., by work hardening, grain refinement, and residual stress, through the modified layers of the manufactured part. The secondary processes can be interspersed with the additive manufactured layers, e.g., applied every few layers rather than every layer, depending on a particular set of physical, mechanical, and chemical properties desired in a final manufactured part. One or more parameters of the secondary processes can be selected to impart deep enough compressive residual stresses that will not be canceled by thermal loads from the additive manufacturing processes as subsequent layers are printed on top of the modified layers.

Example Operating Environment

Figure 1A:
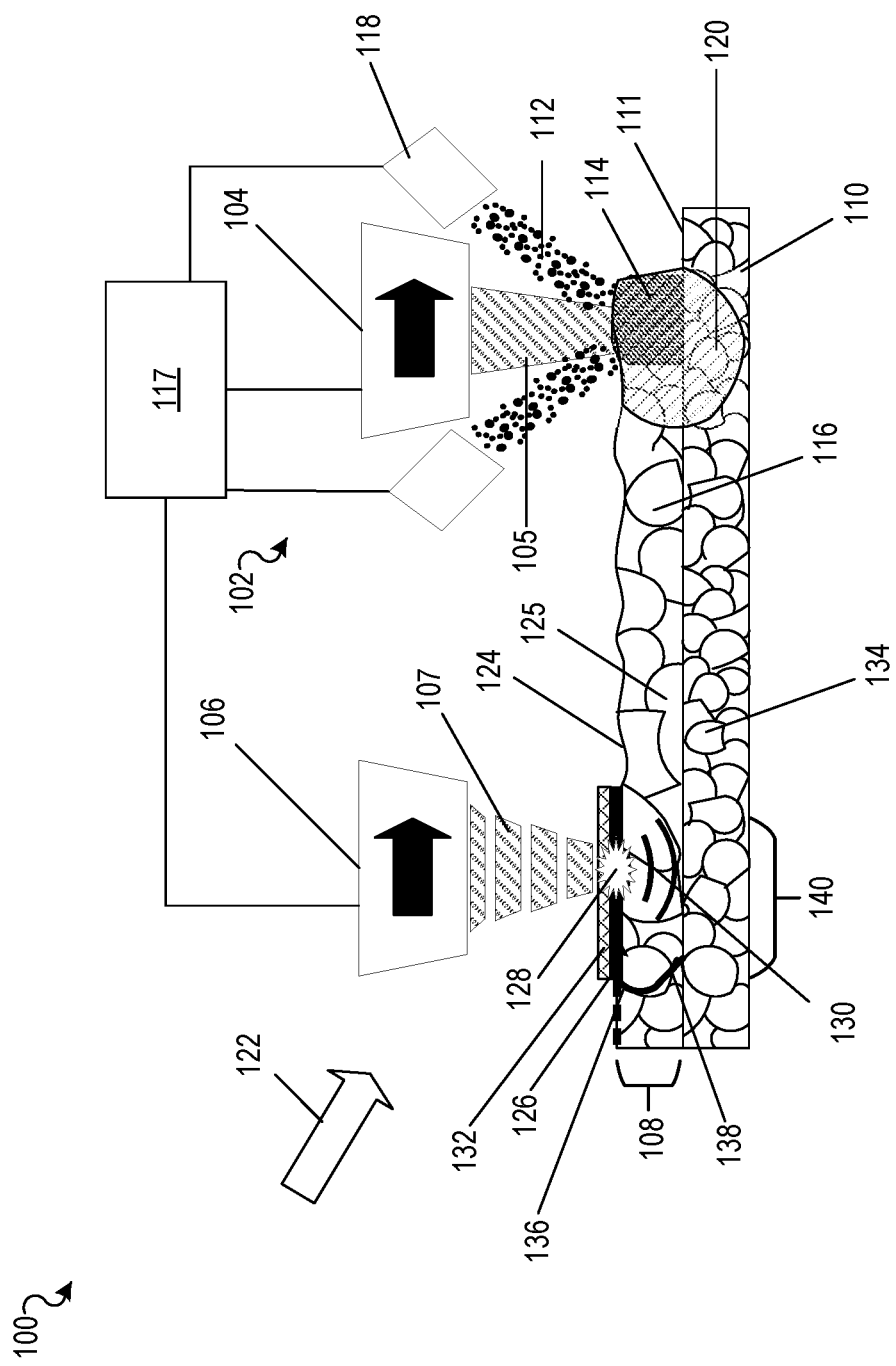
FIG. 1A depicts an example operating environment for a hybrid additive manufacturing system.

FIG. 1A depicts an example operating environment 100 for a hybrid additive manufacturing system 102. Hybrid additive manufacturing (hybrid-AM) system 102 includes two energy sources: a sintering energy source 104 and a surface treatment source 106, for providing localized amounts of energy to manufacture one or more additive layers 108 on a workpiece 110.

Workpiece 110 can be composed of various materials, depending in part on a desired part and/or application. In one example, a material is a magnesium-based alloy where the desired part may be a biodegradable medical implant. In another example, a material is stainless steel 420 for an industrial component. Though depicted in FIGS. 1A, 1B as having a flat exposed surface 111 onto which the additive layers are manufactured, the workpiece 110 can include a curved and/or irregular surface. In one example, workpiece is 8 mm of thick cold-rolled 420 stainless steel.

Sintering energy source 104 can be a laser sintering source, e.g., an Nd-YAG pulsed laser or another concentrated energy source for performing laser powder bed fusion (L-PBF) using a laser beam 105, e.g., a pulsed or continuous-wave laser beam. Laser powder bed fusion (L-PBF) creates parts by laser melting stationary powder material 112 in a print bed 114.

Powder material 112 can be composed of various materials, depending in part on a material composition of the workpiece 110 and desired end part. Powder material 112 can have a range of diameters, depending in part on application of the end part and the material of the powder material 112. In one example, powder material 112 is 420 stainless steel with particle diameters ranging between 45 micron to 105 micron.

The melted stationary powder material 112 in a print bed 114 forms a melt pool 120 that forms in the print bed 114 and can additionally extend into one or more of the previously formed layers 116 and the workpiece 110. The melted material of the melt pool 120 combines with the partially melted workpiece 110 to form a solid bond between layers. For a given material, the critical process variables that affect build quality and the resulting heat affected zone are (a) laser power, (b) deposition speed, (c) powder flow rate, and (d) the atmosphere.

Once a formed layer 116 is printed, another layer of powder material 112 is deposited on top through spreading or rolling, e.g., powder distribution source 118. Powder distribution source 118 can dispense powder material 112 to the print bed 114 at a rate sufficient to track the speed of the L-PBF process, e.g., at a rate of 6 liters/minute.

In some implementations, the L-PBF process is performed in an inert environment, where an inert gas purge 122, e.g., argon, is used to prevent oxidation of the newly formed layers 116. In one example, an argon purge of at least 24 liters/minute is used. One or more environmental controllers, e.g., a hygrometer, can be utilized to reach a threshold inert environment for performing the hybrid-AM processes.

This print and deposit cycle repeats until completion of the build. For a given material, the critical process variables that affect build quality and the resulting heat affected zone are (a) laser power, (b) scanning speed, (c) exposure/scanning pattern, and (d) the atmosphere. The heat-affected zone from L-PBF can be on the order of a few hundred microns. In one example, laser power can be 390 Watts, scan speed is 12 millimeters/second, and auger speed is six rotations per minute (RPM).

As manufactured, the formed layer 116 includes a first additive manufactured grain size 124. Utilizing a secondary process, one or more physical, mechanical, and chemical alterations can be made to the formed layer 116.

In some implementations, the secondary process for the hybrid-AM system 102 utilizes surface treatment source 106. Secondary processes can include one or more cold working processes, e.g., laser peening, shot peening, burnishing, deep rolling, or the like. Surface treatment source 106 can accordingly include various mechanical-based sources, laser-based sources, or the like for a respective cold working process utilized by the hybrid-AM system.

Figure 1B:
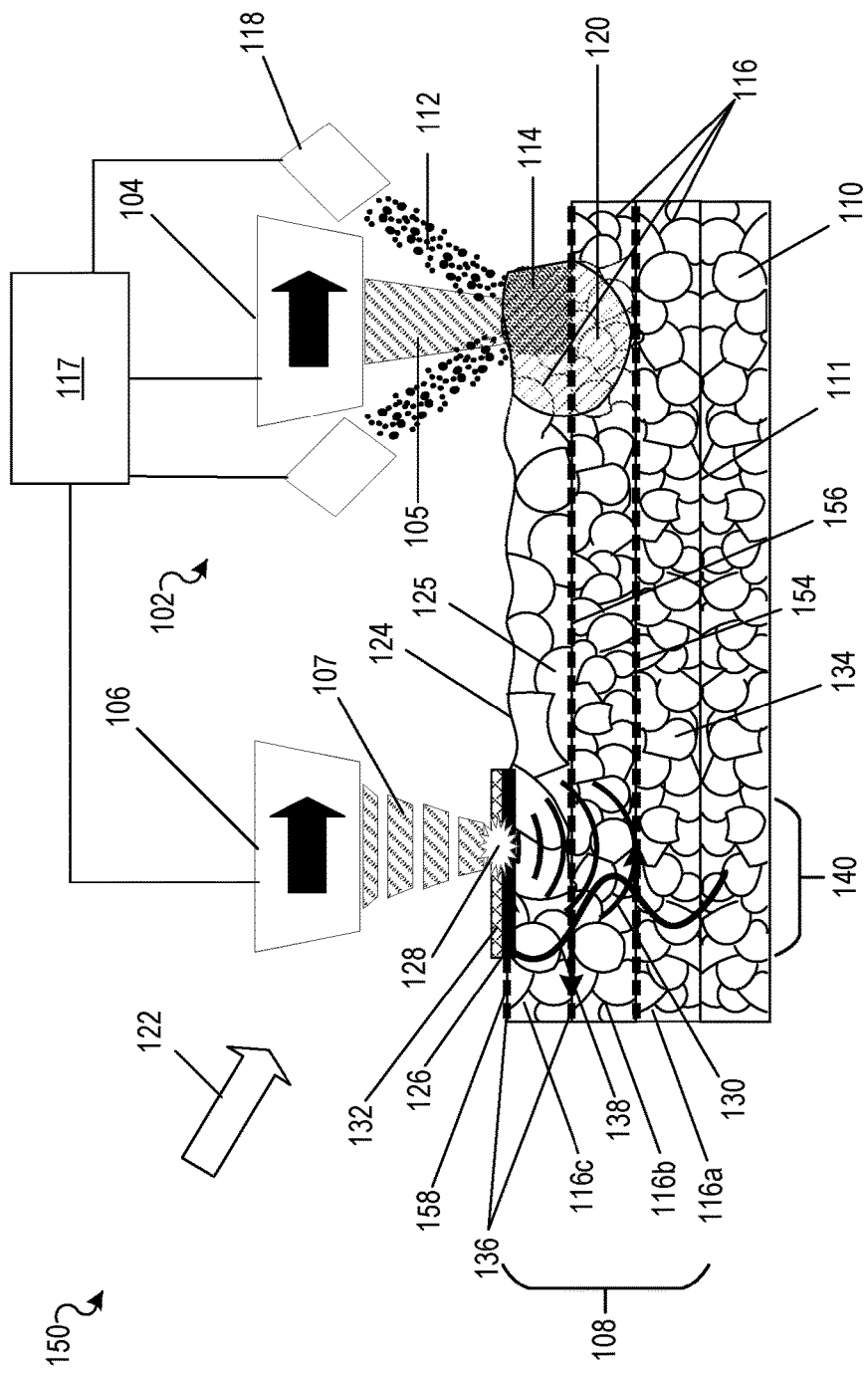
FIG. 1B depicts another example operating environment for a hybrid additive manufacturing system.

In one embodiment, as depicted in FIGS. 1A and 1B, a surface treatment source 106 is a pulsed laser beam 107 to perform laser peening (LP). Laser Peening (LP), also known as laser shock peening, is a mechanical process where pressure waves caused by expanding plasma plastically deform the surface of a material. The plastic deformation from LP induces deep compressive residual stresses (CRS) up to 6 mm below the formed surface 125 of the formed layer 116. The critical process variables that affect CRS are laser power, overlap of sequential peens, workpiece 110 material, and materials for the ablative and confining layers, e.g., material of the powder material 112. LP uses a thin layer of ablative material 126 that is opaque to the surface treatment source 106. The opaque ablative material 126, typically black spray paint or tape, is a sacrificial layer that allows for high-pressure plasma formation. The plasma 128 expands rapidly resulting in a recoiling pressure wave 130 on the order of several gigapascals (GPa). The confining layer 132, e.g., water or glass in conventional laser peening, acts to keep the pressure wave 130 pointing towards the formed surface 125 of the formed layer 116. The confining layer 132 is located between the laser beam 107 and the ablative layer 126. The resulting pressure in confined ablation mode is much larger than the dynamic yield strength. Once the pressure exceeds the dynamic yield strength, plastic deformation occurs and forms a dent. The pressure wave 130 is the mechanical process that hardens and strengthens the formed surface 125.

In some implementations, the secondary processes result in an alteration, e.g., reduction, of grain size 134, and/or one or more dislocations at the formed surface 125. The peened surface 140 can include compressive residual stresses 138 and work hardening, causing higher dislocation density and more refined micro- and nanostructures. Dislocation clusters 136 can inhibit the movement and/or pin the dislocations at an interface of a peened surface 140.

In some implementations, process parameters of the laser-peening source, e.g., wavelength of operation, pulse width, repetition rate, and beam diameter can depend in part on the material of the workpiece 110 and powder material 112. In one example, a laser-peening source can be a 1064 nm wavelength laser operating at eight ns pulses with a 10 Hz repetition rate and a 9 mm beam diameter. Laser peening energy and spot size of the laser 106 can be selected based in part on a thermal budget of the previously treated layers and the properties of the AM layer being treated. In general, a peening energy can be selected to be less than a threshold energy to cancel the desired mechanical properties of the one or more formed layers 116/or previously peened hybrid layers below. In other words, laser peening energy can be selected to impart deep enough compressive residual stresses that will not be canceled by the thermal load from subsequent layers are printed on top, e.g., by L-BPF, of peened layers. Thermal cancellation may occur from undesired stress relaxation and/or redistribution when a new formed layer is added on a peened/burnished surface 140. Energy delivered to the peened layer can be, for example, 700 milliJoules (mJ) with a spot diameter of 1 millimeter.

Though depicted in FIGS. 1A, 1B as a dual process flow, the multiple processes of the hybrid-AM system 102 can be performed by multiple separate sub-systems as asynchronous laser processes. In some implementations, the secondary processes for the hybrid-AM system 102 are performed using shot peening rather than the described laser peening process.

In some implementations, the workpiece 110 is held fixed and the laser sources 104, 106 are moved, e.g., using an automated system, with respect to the workpiece 110. The laser sources 104, 106 can also be held fixed and a scanning source, e.g., using automated moving deflection mirrors, can be used to move the beam of the lasers across the surface of the workpiece 110 and/or formed layers 116.

The operations described with reference to FIGS. 1A and 1B can be controlled by a hybrid-AM controller 117. Controller 117 can be a data processing apparatus in data communication with the energy sources 104, 106, powder distribution source 118, and one or more positioning apparatus for aligning the energy sources, 104, 106 and powder distribution source 118 with respect to the workpiece 110. Additionally, the controller 117 may operate the gas purge 122 to control a composition of atmosphere surrounding the hybrid-AM process.

In some implementations, controller 117 may receive feedback from one or more process monitoring devices, e.g., infrared cameras, sensors, or the like, and incorporate the received feedback into a process feedback loop to adjust one or more parameters of the hybrid-AM process.

In some implementations, as depicted in FIG. 1B, a secondary process, e.g., laser peening, can occur at a frequency of less than every formed layer 116. For example, a number of formed layers between surface treatments can be e.g., five layers, 10 layers, 2 layers, or the like. FIG. 1B depicts another example operating environment 150 for a hybrid additive manufacturing system 102. As depicted in FIG. 1B, a number of additive layers 152 can be manufactured on the workpiece 110, where the additive layers 152 include a set of formed layers 116. One or more of the set of formed layers 116 can be processed by a secondary process, e.g., using the surface treatment source 106.

In some implementations, each formed layer 116 undergoes a secondary process prior to the manufacture of a next formed layer 116. For example, after formed layer 116a is manufactured on the workpiece 110, a laser peening process is performed on the formed surface 154 of the formed layer 116a prior to the manufacture of the subsequent formed layer 116b on top of the formed layer 116a.

In some implementations, secondary processes are performed on intermittent layers, e.g., every five of the formed layers 116 of the additive layers 152 on the workpiece 110 undergo a laser peening process. In instances where a particular formed layer 116a is not to undergo a secondary process, the manufacturing of a subsequent formed layer 116b follows the completion of the particular formed layer 116. In another example, every 10 formed layers 116 undergoes a secondary process, e.g., laser peening. Further details of the interval spacing of the secondary process are discussed with reference to FIGS. 3A-3C below.

In some implementations, a pressure wave 130 induced by a laser peening process penetrates into one or more additional formed layers 116 to induce physical, mechanical, and/or chemical changes in the one or more formed layers. For example, pressure wave 130, as depicted in FIG. 1B, penetrates formed layers 116c and 116b, and can generate physical, mechanical, and/or chemical changes in the formed layers 116c and 116b, including the interface 156 between the two formed layers 116c, 116b. In one example, an orientation and/or grain size of the refined grains 134 can be altered across the interface 156. In another example, residual stress, e.g., from the additive manufacturing process, can be relieved during the peening process and can travel to an exposed surface 158 of the part.

Though depicted in FIGS. 1A and 1B as a laser peening process, a secondary process can additionally or alternatively be a mechanical burnishing or deep-rolling process where mechanical force is applied to an exposed surface 158 of the formed layers 116. One or more secondary processes can be utilized to achieve effects described above with reference to FIGS. 1A and 1B, where formed layers 116 undergo a secondary process to generate physical, mechanical, and/or chemical changes in the formed layers 116 including, for example, the interface 156 between two formed layers 116c, 116b.

Figure 2:
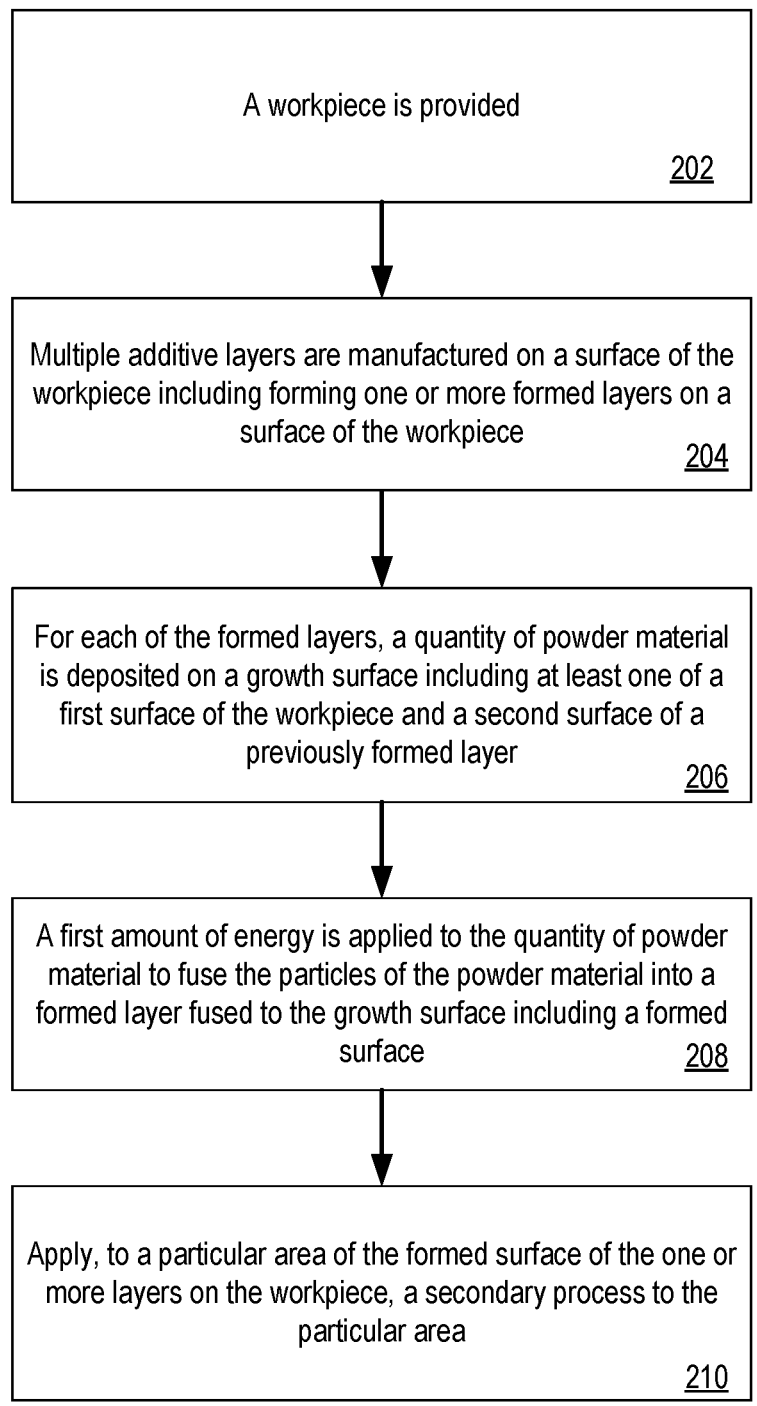
FIG. 2 is a flow diagram of an example process for the hybrid additive manufacturing system.
Figure 4B:
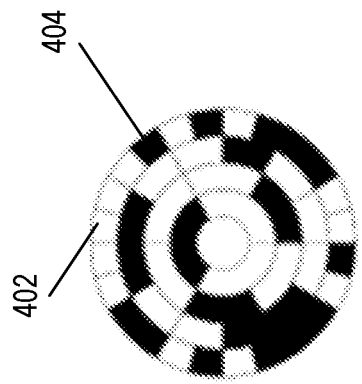
FIGS. 4A-4D depicts example formed layers where a secondary process is selectively applied to different portions of a formed layer.
Figure 4D:
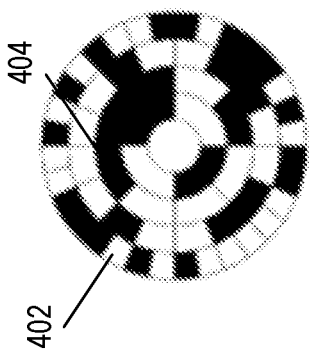
Figure 4A:
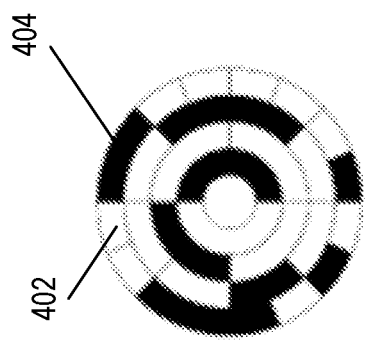
Figure 4C:
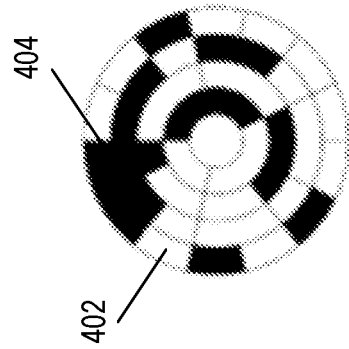

FIG. 2 is a flow diagram of an example process 200 for the hybrid additive manufacturing (hybrid-AM) system. A workpiece is provided (202). Workpiece 110 can be a substrate onto which multiple additive layers will be manufactured. In some implementations, workpiece 110 is a base layer for a part to be manufactured using the hybrid-AM system. The workpiece 110 can be a part needing repair, e.g., a broken or damaged part, which can be repaired by manufacturing one or more layers on the workpiece 110 using the hybrid-AM system 102.

Multiple additive layers are manufactured on a surface of the workpiece including forming one or more formed layers on a surface of the workpiece (204). The multiple additive layers 152 can be manufactured on a surface 111 of the workpiece, where each of the additive layers 152 can be formed as a formed layer 116 on the workpiece 110. For each of the formed layers, a quantity of powder material is deposited on a growth surface included at least one of a first surface of the workpiece and a second surface of a previously formed layer (206). Powder material 112 can be dispensed to the print bed 114 using a powder distribution source 118 to localize the powder material 112 to a region where a new formed layer 116 is to be formed. In one example, powder material 112 is dispensed on surface 111 of the workpiece to form a first formed layer 116a in contact with the surface 111 of the workpiece. In another example, powder material 112 is dispensed on surface 154 of the previously formed first formed layer 116a to form a second formed layer 116b in contact with the surface 154 of the first formed layer 116a.

A first amount of energy is applied to the quantity of powder material to fuse the particles of the powder material into a formed layer fused to the growth surface including a formed surface (208). The first amount of energy can be applied by a sintering energy source 104, e.g., a laser source, where the first amount of energy is sufficient to generate a melt pool 120 within the powder material 112 of the print bed 114 and extending into an underlying layer or the workpiece, e.g., as depicted in FIG. 1A. As the melt pool 120 cools, a formed layer is fused to the growth surface, e.g., surface 111 of the workpiece 110, where grains 124 of the formed layer 116 can be oriented in a same direction as the grains of the underlying growth surface.

In some implementations, applying the first amount of energy includes scanning a laser beam, e.g., laser beam 105 from sintering energy source 104, across the powder material 112 deposited on the growth surface, e.g., in print bed 114, to generate a melt pool 120 and controllably allowing the melt pool to solidify into a formed layer 116.

Apply, to a particular area of the formed surface of the one or more layers on the workpiece, a secondary process to the particular area (210). The secondary process can be applied by a surface treatment source 106, e.g., a laser-peening source, to a particular area of the formed surface 125. In one example, the secondary process is a laser peening process, where an amount of energy provided by a laser-peening source to the particular area can be a sufficient amount of energy to generate a plasma 128 within the particular area of the formed surface 125. In some implementations, the particular area includes a region of the formed surface 125 that includes a laser of ablative material 126 and a confining layer 132.

In some implementations, applying the secondary process includes scanning a pulsed laser beam 107 across the formed surface 125 of the formed layer 116. The generated plasma can propagate a pressure wave 130 through one or more of the one or more formed layers 116 and the workpiece 110, in other words, as a sub-surface treatment. The propagating pressure wave 130 through the one or more formed layers 116 can result in clustered arrays of dislocations 136 at one or more interfaces, e.g., interface 154, 156, between the one or more formed layers, e.g., formed layers 116a, 116b, and 116c. The propagating pressure wave 130 can be sufficient to induce one or more mechanical, physical, and chemical alterations within the one or more of the one or more formed layers 116 and the workpiece 110, for example, grain reorientation and grain size reduction within one or more of the one or more formed layers 116 and workpiece 110.

In some implementations, the secondary process forms a region having compressive residual stress 138 extending from the formed surface within the particular area and through the one or more formed layers, e.g., from formed surface 125 through surface 111.

In some implementations, forming the one or more formed layers 116 includes forming at least two formed layers. e.g., 116a and 116b, on the surface 111 of the workpiece 110, and where the secondary process is applied to the outermost of the formed layers on the workpiece, e.g., on interface 156.

In some implementations, the secondary process is applied using a surface treatment source 106 that is a mechanical source, e.g., a mechanical source for a burnishing, micro-rolling, or deep-rolling process, shot-peening, or the like, where an amount of mechanical energy applied by the surface treatment source 106 is sufficient to produce a desired mechanical and/or chemical alteration in the one or more formed layers. The secondary process can be applied utilizing an ultrasonic impact treatment.

In some implementations, the secondary process is a sub-surface treatment that can be applied to a surface of a formed layer and propagates through a volume of the formed layer. The secondary process can be applied to a surface of a formed layer and propagate through a volume of the formed layer and into one or more additional formed layers that are adjacent to the formed layer and/or the workpiece.

FIGS. 3A-3C are cross-sectional views along axis 334 of example layer structures including interlayer secondary processes at varying periodic and/or non-periodic intervals. FIG. 3A depicts an example layer structure 300 including multiple formed layers, where the multiple formed layers are formed by additive manufacturing processes described herein. As described with reference to FIGS. 1A-1B, a secondary process can be performed on a portion (or all) of a formed layer. As depicted in FIG. 3A, a secondary process is performed on layers 302 of the layer structure 300, and the secondary process is not performed on layers 304 of the layer structure 300. In one example, every third layer of the layer structure 300 that is formed on the workpiece can undergo a secondary process, e.g., a cold working process. The secondary process can therefore be performed in a periodic manner, such that every N layers undergoes the secondary process in the layer structure 300. In one example, a layer structure includes 7 formed layers, where N=3, such that layers 1, 4, and 7 undergo the secondary process and layers 2-3, and 5-6 do not.

In some embodiments, a standard number of consecutive formed layers 302 undergo the secondary process, for example, every N and N+1 number of layers undergoes the secondary process in the layer structure 300. In one example, a layer structure includes 8 formed layers, where N=3, such that layers 1 and 2, 4 and 5, and 7 and 8 undergo the secondary process and layers 3 and 6 do not.

FIG. 3B depicts another example layer structure 310 including multiple formed layers, where the multiple formed layers are formed by additive manufacturing processes described herein. As depicted in FIG. 3B, a secondary process is performed on layers 302 of layer structure 310, and the secondary process is not performed on layers 304 of the layer structure 310. In one example, the secondary process is performed on layers in a non-periodic manner, such that there is a non-periodic interval for applying the secondary process in the layer structure 310, e.g., a number of formed layers 304 between formed layers that undergo the secondary process varies. Additionally, in some embodiments, a non-standard number of consecutive layers undergo the secondary process. In other words, the number of consecutive formed layers 302 that undergo the secondary process can vary. In one example, layers 1 and 2, 6, 8-10 undergo the secondary process, and layers 3-5, and 8 do not.

FIG. 3C depicts another example layer structure 320 including multiple formed layers, where the multiple formed layers are formed by additive manufacturing processes described herein. As depicted in FIG. 3C, a secondary process is performed on portions 306 of layers of the layer structure 320, where the area 326 of a layer 328 can be less than the entire layer 308.

In some embodiments, different areas of a layer can undergo the secondary process. Additionally, or alternatively, multiple layers that undergo the secondary process can each have a different area of the respective layer that is treated with the secondary process. For example, an area 330 that undergoes the secondary process of a layer 332 includes a region 336 that includes a portion of the area that does not spatially overlap with area 326 of layer 328 along an axis 334 that is normal to a surface of the workpiece. In other words, different areas of the formed layers may be treated with the secondary process, where the treated areas for different layers may not overlap with one another (or may have portions of respective areas that do not overlap with one another).

FIGS. 4A-4D depicts example formed layers where a secondary process is selectively applied to different portions of a formed layer. The views depicted in FIGS. 4A-4D are of a surface of a formed layer, perpendicular to axis 334 (not shown). The example selective secondary process areas 402 are not treated with the secondary process and regions 404 that are treated with the secondary process. A distribution of selected regions 404 can be determined based on a set of desired parameters of a formed workpiece.

In some embodiments, empirical methods can be utilized to determine the secondary process areas 402 for formed layers, e.g., through a design of experiments and utilizing test methods (e.g., fatigue tests) to measure structural, chemical, electrical outcomes of a particular layer structure. For example, fatigue life and plastic strain can be measured through monotonic fatigue tests under load control to map two-dimensional and/or three-dimensional stress entanglement of a particular design of secondary process areas for formed layers of a layer structure. In another example, residual stress and microstructures within a layer structure can be measured.

Optimization of the secondary process areas 402 in the formed layers for a layer structure can be performed to yield a particular stress field pattern, and minimized thermal and/or mechanical cancellation of the hybrid additive manufacturing process. Thermal cancellation refers to a loss of favorable residual stress from heat when forming a new layer on top of a layer that has been previously treated by a secondary process. Mechanical cancellation refers to the loss of favorable residual stresses from undesirable stress redistribution when performing a secondary process on top of layers that have been previously treated with the secondary process, e.g., previously peened.

EXAMPLES

Example 1—Project Description

See Appendix A

Example 2—Hybrid Additive Manufacturing for Ultra-fast Corrosion of High Strength Magnesium Alloys See Appendix B Example 3—Glocal Integrity in 420 Stainless Steel by Asynchronous Laser Processing See Appendix C While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A hybrid additive manufacturing method comprising:
   providing a workpiece; and
   manufacturing a plurality of additive layers on a surface of the workpiece, wherein manufacturing each of the plurality of additive layers comprises:
      forming a formed layer on a surface of the workpiece, wherein forming each of the formed layers comprises:
         depositing a quantity of powder material on a growth surface, the growth surface comprised of at least one of a first surface of the workpiece and a second surface of a previously formed layer; and
         applying a first amount of energy from a sintering energy source to the quantity of powder material to fuse particles of the powder material into a formed layer fused to the growth surface, wherein the formed layer comprises a formed surface; and
      applying, to a particular area of the formed surfaces of a plurality of the formed layers on the workpiece, a secondary process by a surface treatment source, the secondary process comprising an interlayer laser peening process of selective ones of the formed layers and selective portions of the formed layers in a non-periodic manner such that the plurality of formed layers comprise spatially overlapping and non-overlapping regions subjected to said laser peening.

2. The method of claim 1, wherein the secondary process comprises a laser peening process that generates a plasma within the particular area on the formed surfaces.

3. The method of claim 2, wherein the generated plasma propagates a pressure wave through one or more of the formed layers and the workpiece.

4. The method of claim 3, wherein the propagating pressure wave results in clustered arrays of dislocations at one or more interfaces between the formed layers.

5. The method of claim 1, wherein the secondary process induces one or more mechanical, physical, electrical, and chemical alterations within one or more of the formed layers and the workpiece.

6. The method of claim 5, wherein the secondary process results in grain reorientation and grain size reduction within one or more of the formed layers and workpiece.

7. The method of claim 1, wherein the secondary process forms a region having compressive residual stress extending from the formed surfaces within the particular area and through the formed layers.

8. The method of claim 1, wherein the secondary process is applied to selective ones of the formed layers and to selective portions of the formed layers in both a periodic and non-periodic manner.

9. The method of claim 1, wherein the secondary process further comprises one or more of a shot peening, burnishing, or deep-rolling process.

10. The method of claim 1, wherein applying the secondary process to the particular area of the formed layers further comprises:
   for a first of the formed layers, applying the secondary process within a first area of the first formed layer, and
   for a second of the formed layers, applying the secondary process within a second area of the second formed layer,
   wherein a region of the first area does not overlap with the second area in a direction orthogonal to the surface of the workpiece.

11. A hybrid additive manufacturing system comprising:
   a sintering energy source;
   a surface treatment source;
   a powder distribution source configured to distribute powder material in a powder bed on a surface of a workpiece; and
   a controller configured to control the operations of the sintering energy source, secondary treatment source, and powder distribution source so as to manufacture a plurality of additive layers on the surface of the workpiece, wherein said manufacturing of each of the plurality of additive layers comprises:
      forming a formed layer on the surface of the workpiece, wherein forming each of the formed layers comprises:
         depositing, by the powder distribution source, a quantity of powder material on a growth surface, the growth surface comprised of at least one of a first surface of the workpiece and a second surface of a previously formed layer; and
         applying, by the sintering energy source, a first amount of energy to the quantity of powder material to fuse particles of the powder material into a formed layer fused to the growth surface, wherein the formed layer comprises a formed surface; and
      applying, by the surface treatment source and to a particular area of the formed surfaces of the plurality of formed layers on the workpiece, a secondary process comprising an interlayer laser peening of selective ones of the formed layers and selective portions of the formed layers in a non-periodic manner such that the plurality of formed layers comprise spatially overlapping and non-overlapping regions subjected to said laser peening.

12. The system of claim 11, wherein the surface treatment source comprises a pulsed laser beam to perform the laser peening.

13. The system of claim 12, wherein the secondary process comprises generating a plasma within the particular area on the formed surfaces.

14. The system of claim 13, wherein the generated plasma propagates a pressure wave through one or more of the formed layers and the workpiece.

15. The system of claim 14, wherein the secondary process applied to the formed layers results in clustered arrays of dislocations at one or more interfaces between the formed layers.

16. The system of claim 11, wherein the secondary process induces one or more mechanical, physical, electrical, and chemical alterations within one or more of the formed layers and the workpiece.

17. The system of claim 16, wherein the secondary process further comprises a sub-surface treatment applied through one or more of the formed layers and workpiece and results in grain reorientation and grain size reduction within one or more of the formed layers and workpiece.

18. The system of claim 11, wherein the secondary process forms a region having compressive residual stress extending from the formed surfaces within the particular area and through the formed layers.

19. The system of claim 11, wherein the secondary process is applied selective ones of the formed layers and to selective portions of the formed layers in both a periodic and non-periodic manner.

20. The system of claim 11, wherein applying the secondary process to the particular area of the formed layers further comprises:
   for a first of the formed layers, applying the secondary process within a first area of the first formed layer, and
   for a second of the formed layers, applying the secondary process within a second area of the second formed layer,
   wherein a region of the first area does not overlap with the second area in a direction orthogonal to the surface of the workpiece.

* * * * *